US010878707B1

United States Patent
Shu-Zhong Cabos et al.

(10) Patent No.: US 10,878,707 B1
(45) Date of Patent: Dec. 29, 2020

(54) WAKE VORTEX SEPARATION DETERMINATION

(71) Applicant: THE BOEING COMPANY, Chicago, IL (US)

(72) Inventors: Ralf Rene Shu-Zhong Cabos, Hainburg (DE); Jonas Schulze, Hainburg (DE)

(73) Assignee: THE BOEING COMPANY, Chicago, IL (US)

( * ) Notice: Subject to any disclaimer, the term of this patent is extended or adjusted under 35 U.S.C. 154(b) by 0 days.

(21) Appl. No.: 16/510,011

(22) Filed: Jul. 12, 2019

(51) Int. Cl.
*G01C 23/00* (2006.01)
*G08G 5/00* (2006.01)
*G01B 13/02* (2006.01)

(52) U.S. Cl.
CPC .......... *G08G 5/0043* (2013.01); *G01B 13/02* (2013.01)

(58) Field of Classification Search
None
See application file for complete search history.

(56) References Cited

U.S. PATENT DOCUMENTS

| | | | | |
|---|---|---|---|---|
| 5,634,613 A | * | 6/1997 | McCarthy | B64C 23/06 244/199.1 |
| 2002/0075171 A1 | * | 6/2002 | Kuntman | G01S 13/933 340/961 |
| 2003/0222795 A1 | * | 12/2003 | Holforty | B64D 43/00 340/968 |
| 2005/0103944 A1 | * | 5/2005 | Greenblatt | B64C 23/04 244/200.1 |
| 2008/0030375 A1 | * | 2/2008 | Cotton | G01S 17/86 340/945 |
| 2010/0294890 A1 | * | 11/2010 | Journade | B64C 23/06 244/199.1 |
| 2014/0136110 A1 | * | 5/2014 | Nykl | G08G 5/0078 702/3 |
| 2015/0235559 A1 | * | 8/2015 | Alekseev | G08G 5/0095 701/120 |

* cited by examiner

*Primary Examiner* — Julie B Lieu
(74) *Attorney, Agent, or Firm* — Patterson + Sheridan, LLP

(57) ABSTRACT

Techniques for updating wake separation distance between aircraft are described. A sensors mesh within a flight path of an aircraft is used to detect when a wake vortex from the aircraft has drifted onto the sensor mesh. A minimum wake separation distance and separation interval for following aircraft are determined based on the various sensor measurements, environmental conditions, and aircraft properties. The minimum wake separation distance and separation interval are used to minimize aircraft separation distances between aircraft that are required due to wake vortex turbulence caused by aircraft during flight.

20 Claims, 10 Drawing Sheets

WAKE VORTEX SEPARATION DETERMINATION

FIELD

Aspects of the present disclosure relate to improving air traffic control patterns and aircraft traffic congestion on the ground and in airspace. Specifically, embodiments described herein are related to minimizing aircraft separation distances between aircraft that are required due to wake vortex turbulence caused by aircraft during flight.

BACKGROUND

Aircraft create areas of air turbulence in the airspace around the aircraft and in the wake of the aircraft during flight. Wake vortices, commonly referred to as a wake vortex and/or wake vortex turbulence, are one source of air turbulence in the wake of the aircraft in flight. In many cases, the wake vortices of a first aircraft can cause a second aircraft that encounters the wake vortices to experience turbulence and instability in the flight and control of the aircraft. In order to avoid the problems that can be caused by wake vortices, air traffic control systems typically use broad, size-based aircraft categories to set separation distances between aircraft. These broad categories are meant to ensure that following aircraft avoid the wake vortices created by other aircraft in nearby airspace. However, in the interest of safety, these broad categories provide for wake separation distances between aircraft that are often greater than distances that are actually needed to guarantee that the wake vortices from an aircraft have dispersed and drifted out of the flight path airspace, prior to a following aircraft passing through the airspace.

While these broad categories are meant to improve the safety and control of the following aircraft, they can also create excessive airspace between aircraft, such as when a wake vortex has drifted out of a flight path long before a following aircraft enters the airspace. Furthermore, as the number and type of aircraft movements increases, the amount of congestion and delay on the ground at airports and in controlled airspaces increases. The increased amounts of congestion and delay, in turn, create a need for reducing inefficiencies in the use of restricted corridors of airspace around airports. Reducing the excessive separation distances between each aircraft during take-off and landing would increase the throughput of the airport infrastructure and reduce congestion in the airspace and on the ground.

BRIEF SUMMARY

Embodiments described herein include a system of one or more computers that can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a method for wake separation distance. The method includes detecting, at a first time, an aircraft passing a first point associated with a plurality of mesh sensors, receiving at least one aircraft property for the aircraft, and receiving at least one time-stamped sensor measurement from the plurality of mesh sensors. The method also includes determining a vertical drift of a wake vortex from the aircraft using the first time, the at least one time-stamped sensor measurement, and the at least one aircraft property, determining, based on the vertical drift of the wake vortex, a minimum wake separation distance for a next aircraft, and updating a separation interval for the next aircraft based on the minimum wake separation distance. Other embodiments of this aspect include corresponding computer systems, apparatus, and computer programs recorded on one or more computer storage devices, each configured to perform the actions of the methods.

Another embodiment described herein includes a system for wake separation distance. The system includes a processor and a memory. The memory includes instructions which, when executed on the processor, performs an operation, the operation including: detecting, at a first time, an aircraft passing a first point associated with a plurality of mesh sensors, receiving at least one aircraft property for the aircraft, and receiving at least one time-stamped sensor measurement from the plurality of mesh sensors. The operation also includes determining a vertical drift of a wake vortex from the aircraft using the first time, the at least one time-stamped sensor measurement, and the at least one aircraft property, determining, based on the vertical drift of the wake vortex, a minimum wake separation distance for a next aircraft, and updating a separation interval for the next aircraft based on the minimum wake separation distance.

Another embodiment described herein includes a computer program product for wake separation distance. The computer program product including a computer-readable storage medium having computer-readable program code embodied therewith, the computer-readable program code executable by one or more computer processors to perform an operation. The operation includes detecting, at a first time, an aircraft passing a first point associated with a plurality of mesh sensors; receiving at least one aircraft property for the aircraft, receiving at least one time-stamped sensor measurement from the plurality of mesh sensors, and determining a vertical drift of a wake vortex from the aircraft using the first time, the at least one time-stamped sensor measurement, and the at least one aircraft property. The operation also includes determining, based on the vertical drift of the wake vortex, a minimum wake separation distance for a next aircraft, and updating a separation interval for the next aircraft based on the minimum wake separation distance.

BRIEF DESCRIPTION OF THE DRAWINGS

So that the manner in which the above recited features of the present disclosure can be understood in detail, a more particular description of the disclosure, briefly summarized above, may be had by reference to aspects, some of which are illustrated in the appended drawings.

DETAILED DESCRIPTION

Air traffic controller systems balance the safety of aircraft in the controlled airspace with the efficiency of the use of the airspace and the ground resources and infrastructure at airports. In cases where aircraft travel too closely together, a following aircraft may experience turbulence caused by wake vortices from a leading aircraft. This problem is particularly prevalent in airport approach and departure corridors where many aircraft traverse well-defined and limited airspaces to approach and depart from runways. In some examples, such as during take-off and landing maneuvers, aircraft travel at slower speeds and at lower altitudes than are typical during flight. Encountering wake vortex turbulence during these maneuvers can cause aircraft instability and passenger unrest. In order to prevent such occurrences, conventional air traffic control systems categorize aircraft by size and use these categories to define minimum wake separation distances between aircraft.

While these guidelines are generally effective, their simplicity leads to excessive separation distances between aircraft, which leads to fewer aircraft being able to take-off or land in any given block of time. For example, the conventional guidelines do not take into account specific characteristics of the aircraft at the time of approach or departure, the weather, or other observable features that may significantly refines the estimate of an appropriate separation distances. The system and methods described herein provide for determining a "drift" of a wake vortex based on observable data, such as vertical air flow measurements obtained by a sensor mesh. The vertical drift may then be used to determine an appropriate minimum wake separation distance between two craft travelling along the same flight corridor.

Figure 1:
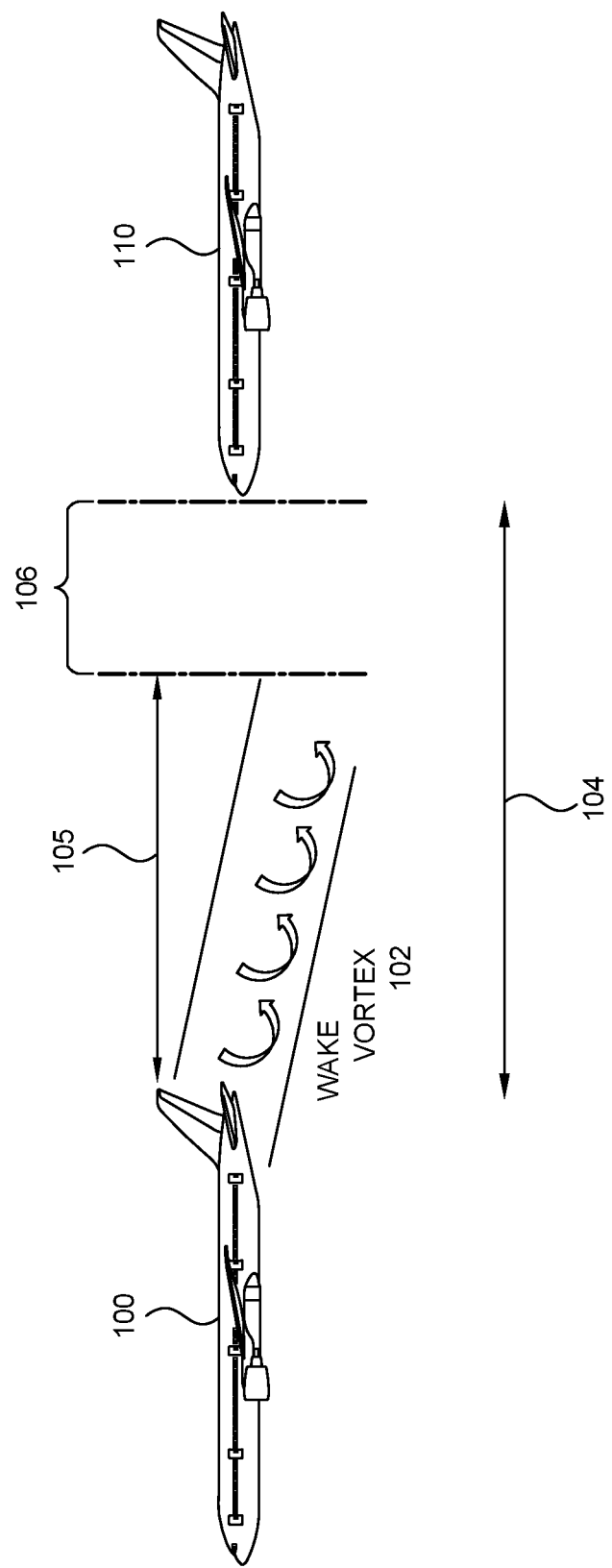
FIG. 1 depicts an example of a wake vortex created by an aircraft.

FIG. 1 depicts an example of an aircraft 100 and a wake vortex 102 created by the aircraft 100. The next or following aircraft 110 maintains a wake separation distance 104 behind the aircraft 100 in order to avoid entering airspace where the wake vortex 102 is still present. However, in this example, the wake vortex 102 has a downward vertical drift. Consequently, the minimum wake separation distance 105 is less than the recommended wake separation distance 104 (e.g., based on categorical rules, as described above) by an amount referred to as the excess wake separation distance 106. In some examples, the wake separation distance 104 is set by an air traffic control system based on categorical aircraft weight-based wake separation distances. These categories result in the excess wake separation distances such as the excess wake separation distance 106 because, for example, a given category encompasses a broad selection of aircrafts and weights. The systems and methods described herein in relation to FIGS. 2-8 enable the excess wake separation distance 106 to be beneficially reduced, which in-turn improves airspace utilization and throughput—especially within controlled flight corridors, such as landing approach and take-off corridors. The benefit of more effective use of the airspace further benefits the utilization of airline resources and airports, such as by allowing more flights to be serviced during a given time interval.

Figure 2:
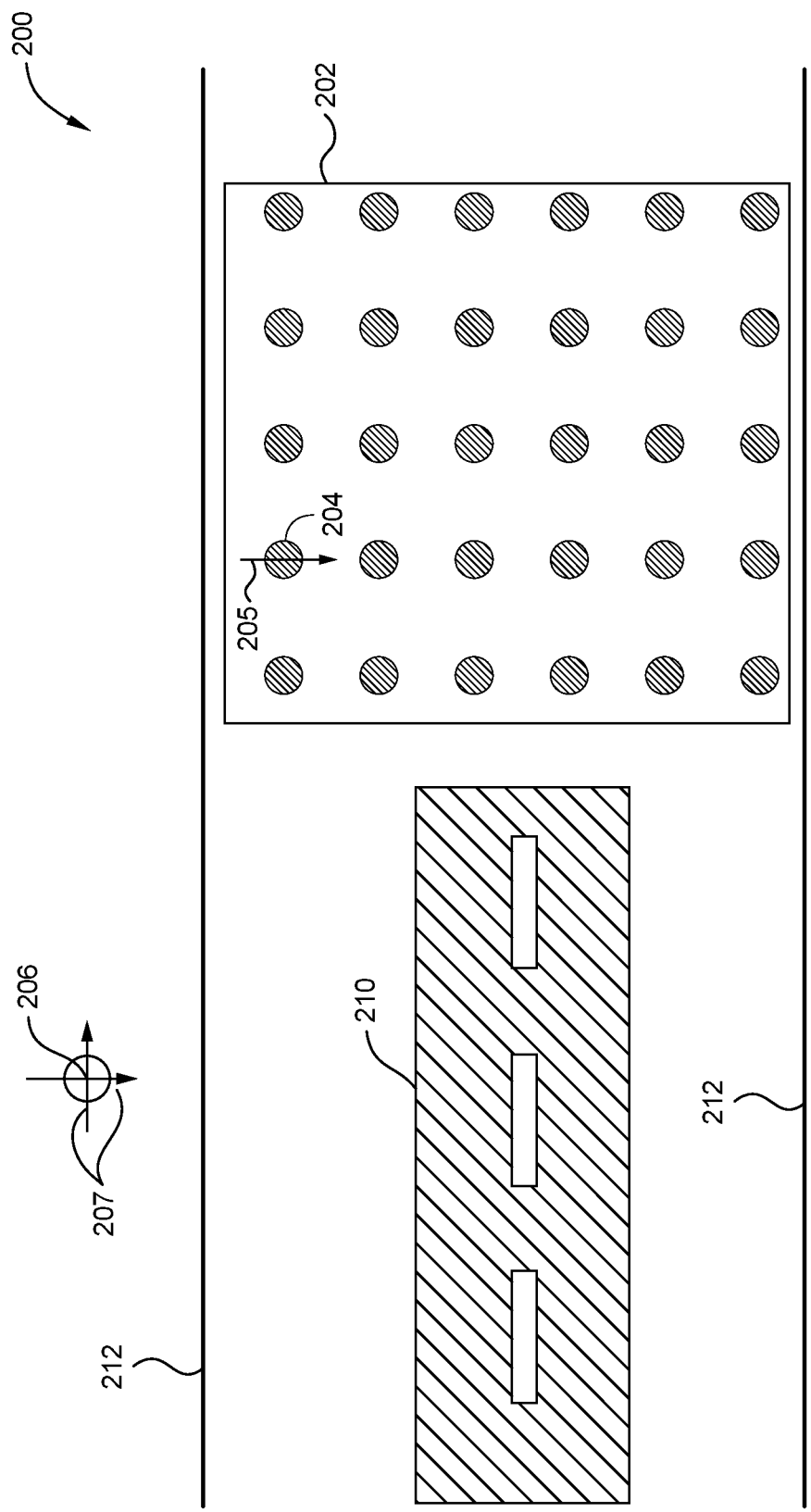
FIG. 2 depicts an example runway system and associated sensor mesh.

FIG. 2 depicts an example runway system and sensor mesh. The runway system 200 includes the runway 210 where aircraft, such as aircraft 100 and following aircraft 110 in FIG. 1, perform take-offs and landings. In some examples, the runway 210 has an associated aircraft corridor or aircraft path 212 in airspace where an aircraft taking-off and/or landing on the runway 210 passes through during the various movements. While illustrated in two-dimensions in FIG. 2, the aircraft path 212 includes any airspace above and between the lines demarcating the aircraft path 212 as illustrated in FIG. 2. Further, in some embodiments, the aircraft path or corridor may be defined in three dimensions, such as a glide slope or take-off profile.

The runway system 200 also includes a sensor mesh 202, which includes a plurality of sensors 204. In some examples, the sensors 204 include air flow sensors, such as air flow sensors, air speed or velocity sensors, and the like. In some examples, the sensors 204 include vertical air flow sensors configured to measure air flows 205 associated with the wake vortices. The vertical air flows may be associated with air flows created by wake vortices from aircraft (e.g., wake vortex 102 in FIG. 1). In some examples, in order to sense the wake vortices, the sensor mesh 202 and/or the sensors 204 are positioned proximate to the runway 210 and/or along the aircraft path 212 for the runway 210.

In some examples, the runway system 200 also includes environmental sensors 206, which measure the environment and/or ambient conditions 207. In some examples, the environmental sensors are positioned away from the sensor mesh 202. In other examples, the environmental sensors are positioned proximate to and/or are incorporated into the sensor mesh 202. For example, a sensor in the sensors 204 may be configured to both measure vertical air flows created by a wake vortex and the ambient conditions 207. In some examples, the ambient conditions include ambient temperature, ambient wind speed, and/or other atmospheric and environmental conditions. In some examples, the ambient conditions 207 measured at the environmental sensors 206 and the air flows 205 measured at the sensor mesh are used to determine when a wake vortex has drifted into the sensor mesh 202.

Figure 3:
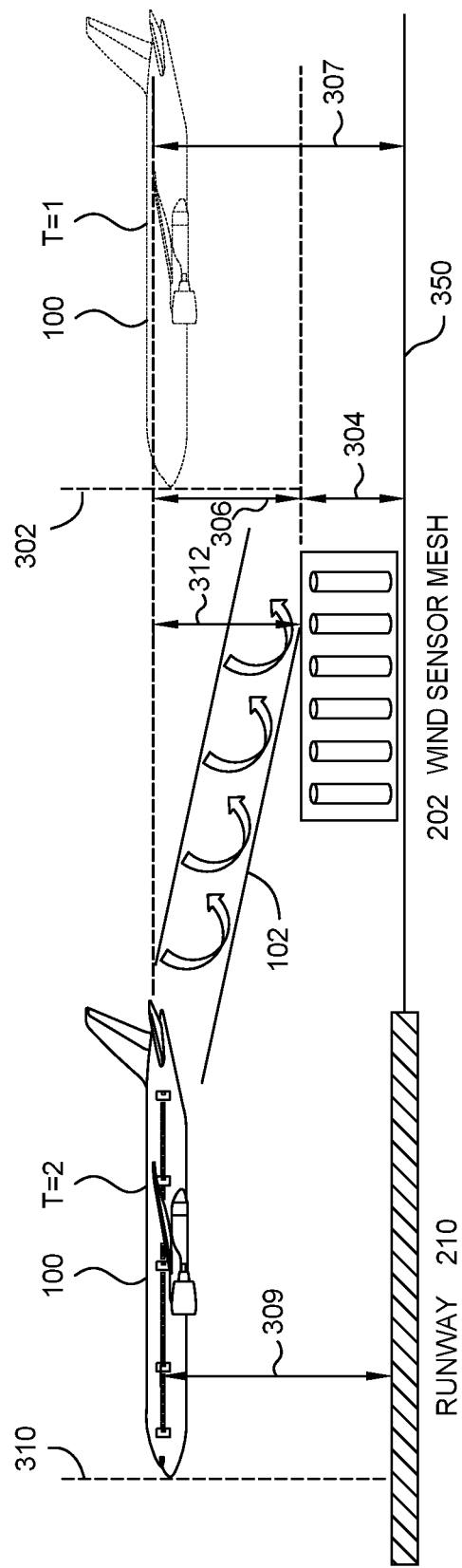
FIG. 3 depicts an example of an aircraft interacting with a runway system and a sensor mesh.

FIG. 3 depicts an example of an aircraft interacting with a runway system and a sensor mesh. As shown, the aircraft 100 is at a first position at the first point 302 at time 1 (T1). In some examples, the first position at first point 302 can be measure in relation to the runway 210 and/or the sensor mesh 202. For example, when the aircraft 100 is on approach for landing on the runway 210, the aircraft 100 passes the first point 302. In some examples, the first point 302 is associated with the sensor mesh 202. For example, the first point 302 is an edge of the sensor mesh 202. In some examples, the position of the first point 302 in relation to the sensor mesh 202 is known. For example, the first point may be positioned at a set known distance away from the sensor mesh 202.

In some examples, at T1, the aircraft is detected passing the first point 302 using positioning sensors such as a radio, visual, and/or any other type of detection sensors associated with the sensor mesh and/or a wake vortex system 500 described in relation to FIG. 5. At T1, the aircraft 100 has a first altitude 307 (e.g., the altitude of the aircraft above a ground surface 305). In some examples, the aircraft height 306 above the sensor mesh 202 is computed from the first altitude 307 and the sensor mesh height 304. In some examples, the aircraft height 306 is used to compute a vertical drift of the wake vortex 102, which is indicated in FIG. 3 as wake vortex vertical drift 312.

At a second time (T2), the sensor mesh 202 detects one or more vertical air flows at one or more of the sensors 204 and generates time-stamped sensor measurements for the vertical air flows. In some examples, the wake vortex vertical drift 312 is determined using the first time, the time-stamped air flow measurements, and one or more aircraft properties, such as the first altitude 307, and/or the calculated aircraft height 306, along with other aircraft properties at T2, such as altitude of the aircraft at T2, altitude 309, and a position of the aircraft at T2 (e.g., second point 310). The determination of the vertical drift of the wake vortex vertical drift 312 is described in more detail in relation to FIGS. 5A-8.

Figure 4A:
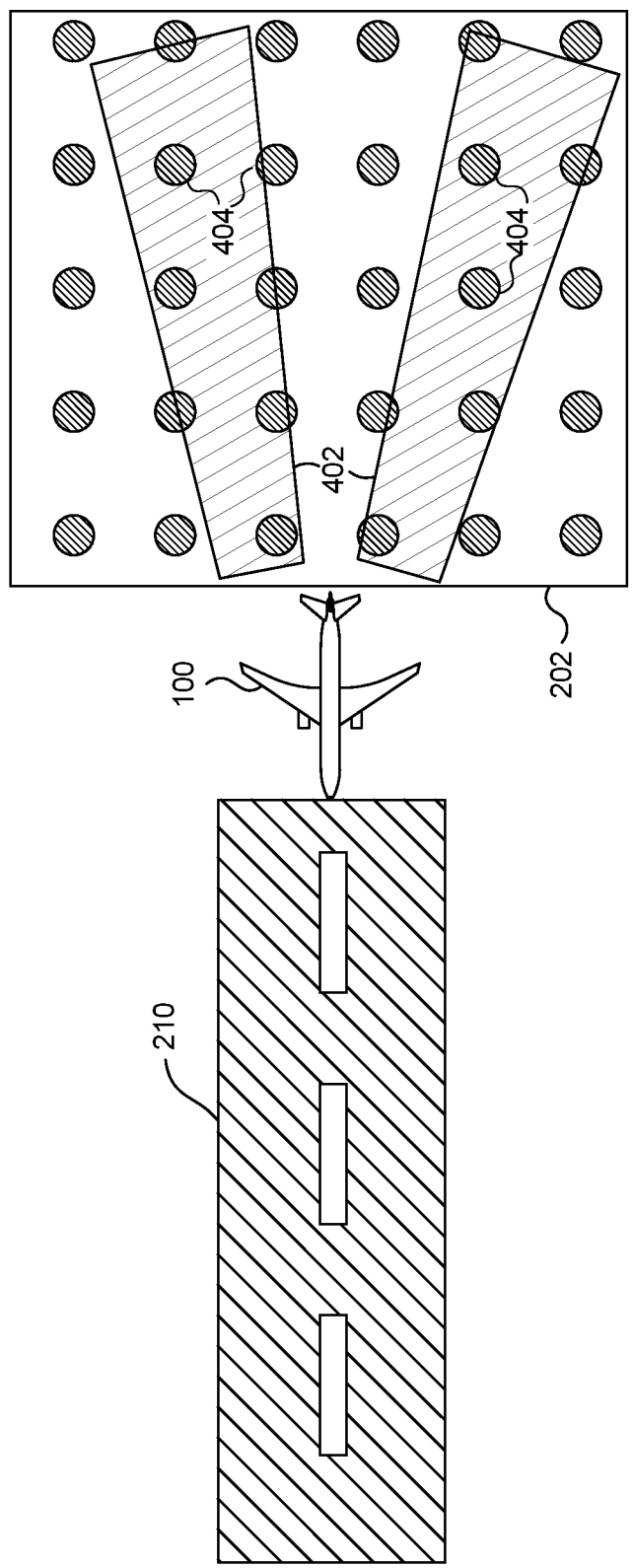
FIGS. 4A-4B depict examples of an aircraft wake vortex extent area over a sensor mesh.
Figure 4B:
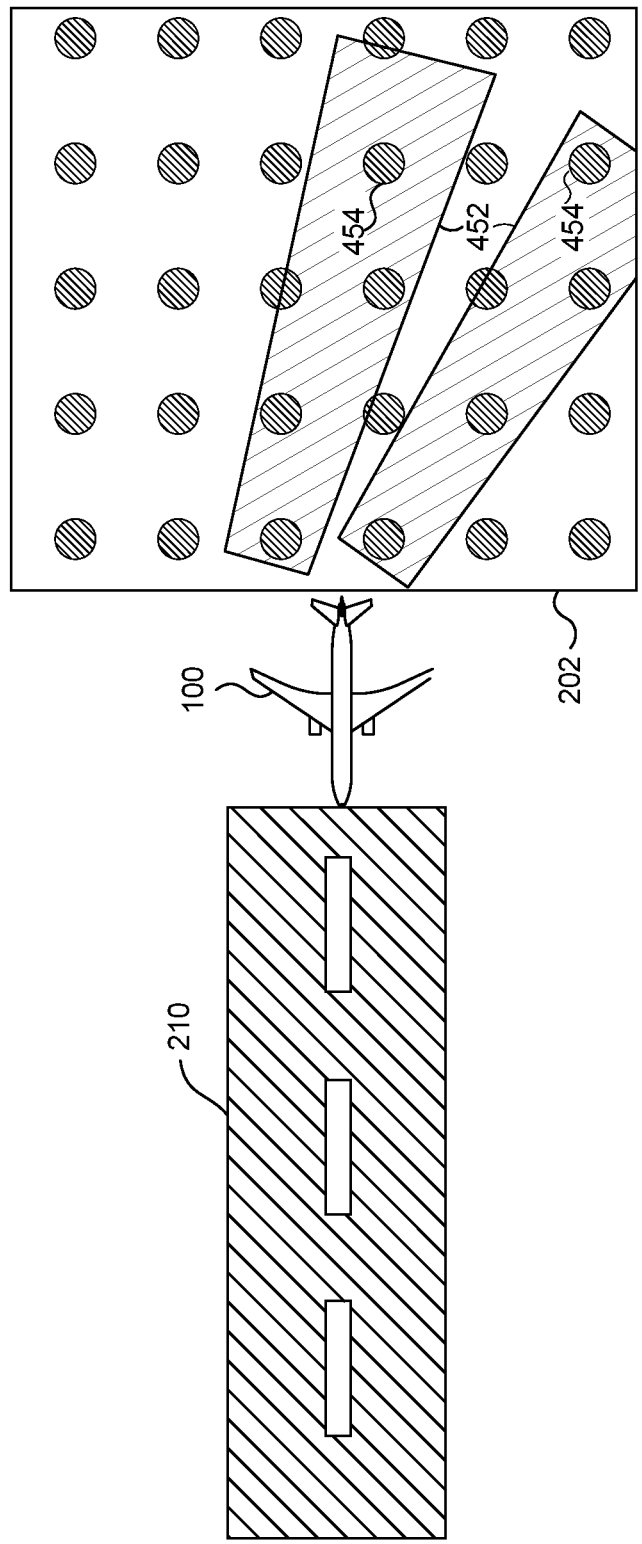

FIGS. 4A-4B depict examples of an aircraft wake vortex extent area over a sensor mesh. In particular, FIG. 4A depicts an example wake vortex extent area, extent area 402, over the sensor mesh 202. In some examples, a wake vortex (e.g., 102 in FIGS. 1 and 3) drifts into the sensor mesh at T2 and affects a subset of the sensors 204, such as affected sensors 404. In some examples, the affected sensors 404 measure or otherwise detect air flows (e.g. vertical air flows) caused by wake vortices. In some examples, the wake vortex 102 and, in turn, the extent area 402 is not greatly affected by lateral air flows such that the wake vortex 102 drifts vertically down and directly onto the sensor mesh.

FIG. 4B depicts another example wake vortex extent area 452, wherein the wake vortices (not shown) have been affected by lateral winds. The winds push the vortices as they drift downward and the resulting affected sensors 454 are thus different in this example as compared to the example in FIG. 4A.

Figure 5A:
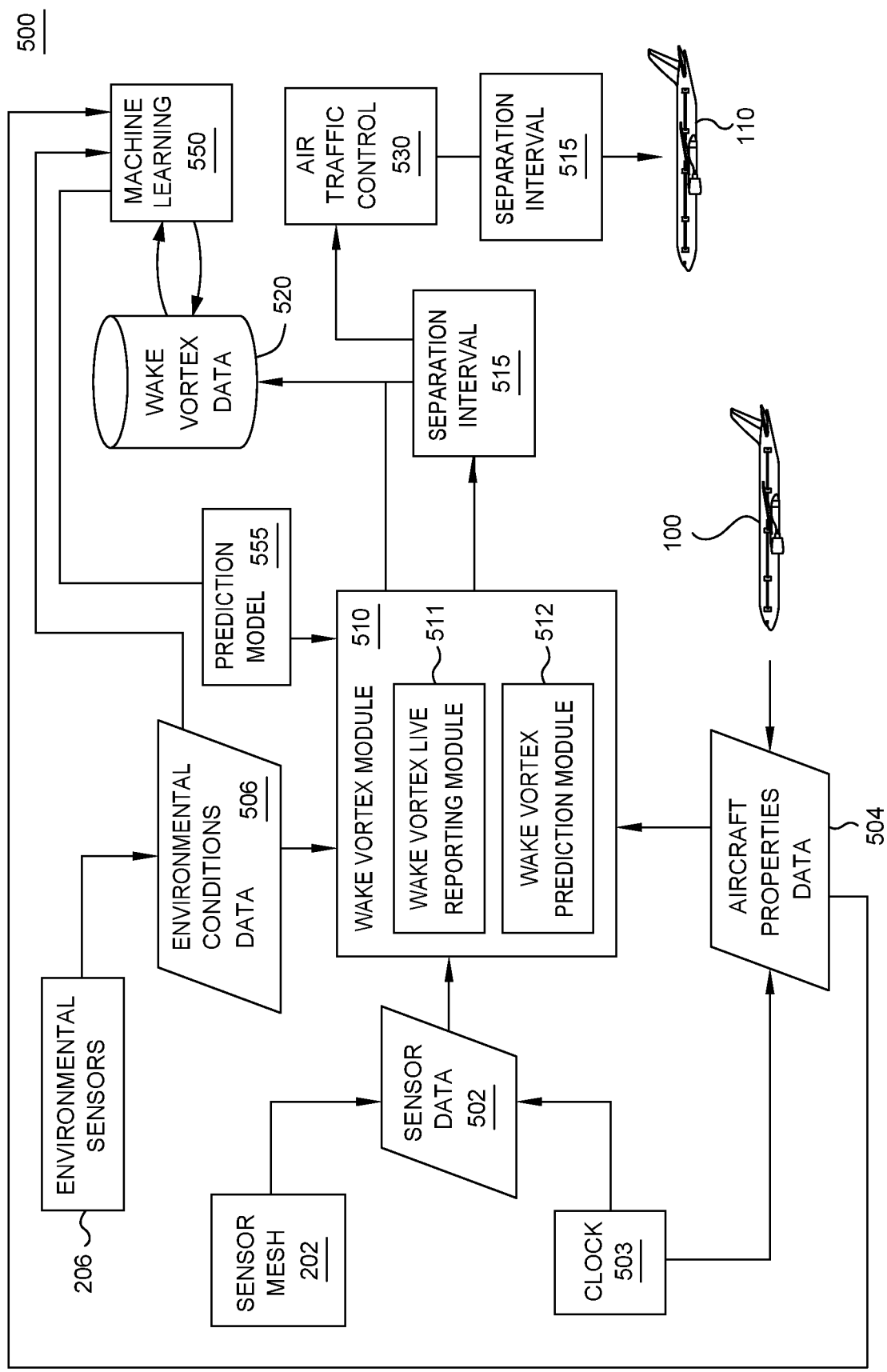
FIG. 5A depicts an example wake vortex system.

FIG. 5A depicts an example wake vortex system, wake vortex system 500. The wake vortex system 500 includes the sensor mesh 202 and the environmental sensors 206 described in relation to FIG. 2. Note that in some examples, sensor data from sensor mesh 202 and environmental sensors 206 may be provided by a third-party system, such as a weather service. In other words, wake vortex module 510 may be agnostic to the source of various input data.

The sensor mesh 202 and the sensors 204, provide sensor data 502 to a wake vortex module 510. The environmental sensors 206 also provide environmental conditions data 506 to the wake vortex module 510. Likewise, the aircraft 100 provides aircraft properties data 504 to the wake vortex module 510. In some examples, the aircraft properties data 504 may be provided by an aircraft tracking system and/or other entity (not shown) which compiles and provides aircraft properties for various aircraft.

For example, referring back to FIG. 3, the aircraft properties data may include a lift of the aircraft at the time T1, a speed of the aircraft at the time T1, an altitude of the aircraft at the time T1, (e.g., first altitude 307), an estimated current mass of the aircraft at the time T1, and/or an aircraft type (e.g., a specific type, or a category associated with the aircraft, such as "jumbo"). In some examples, the aircraft properties data 504 are stored in an aircraft properties database (e.g., aircraft properties database 670 in FIG. 6) and accessed by the wake vortex module 510. For example, the aircraft 100 may report its aircraft properties to the aircraft properties database and/or the wake vortex module 510.

In some examples, the sensor data 502, the aircraft properties data 504, and the environmental conditions data 506 are time-stamped by clock 503 in order to synchronize the data measurements. While shown in FIG. 5A as a discrete clock module, the clock 503 may also function as a distributed clock on each component (e.g., on the sensor mesh 202, the sensors 204, and/or the environmental sensors 206, etc.) where the data may be correlated by the wake vortex module 510 based on the timestamps.

In some examples, the wake vortex module 510 includes the wake vortex live reporting module and the wake vortex prediction module. The wake vortex live reporting module uses the sensor data 502, the environmental conditions data 506, and the aircraft properties data 504 to determine the wake vortex vertical drift (e.g., 312 in FIG. 3) of the wake vortices from the aircraft 100 using the first time T1, one or more time-stamped sensor (e.g., air flow speed) measurements in the sensor data 502, and one or more aircraft properties in the aircraft properties data 504. In some examples, the module uses the determined wake vortex vertical drift 312 to determine the minimum wake separation distance (e.g., 105 in FIG. 1) for a next aircraft, such as following aircraft 110. The module also updates a separation interval 515 for the next aircraft based on the minimum wake separation distance 105. In some examples, the separation interval 515 is provided to the following aircraft 110 via an air traffic control module 530.

In some examples, the updated separation interval 515 along with wake vortex data, including the data in sensor data 502, aircraft properties data 504, and environmental conditions data 506 is stored in a wake vortex database 520. In some examples, the wake vortex data includes an identification of the plurality of wake vortex affected sensors, such as the affected sensors 404 and 454 in FIGS. 4A and 4B, a set of time-stamped vertical air flow measurements from the plurality of wake vortex affected sensors, such as the sensor data 502, environmental conditions from the environmental conditions data at T2 received in the environmental conditions data 506, a current position of the aircraft at T2 such as the second point 310, and an altitude of the aircraft at the second time, such as the altitude 309. The wake vortex data in the wake vortex database 520 may be used by the machine learning module 550 to generate, train, and/or update the prediction model 555.

In some examples, the machine learning module 550 uses the data stored in wake vortex database 520 and/or other inputs, such as a plurality of time-stamped sensor measurements in sensor data 502, environmental conditions data in environmental conditions data 506, and the determined wake vortex vertical drift (e.g., 312 in FIG. 3) to produce one or more prediction models for use in predicting a wake vortex vertical drift. In some examples, the machine learning module 550 functions as a neural network in order to produce a prediction model, such as described in relation to FIG. 5B.

Figure 5B:
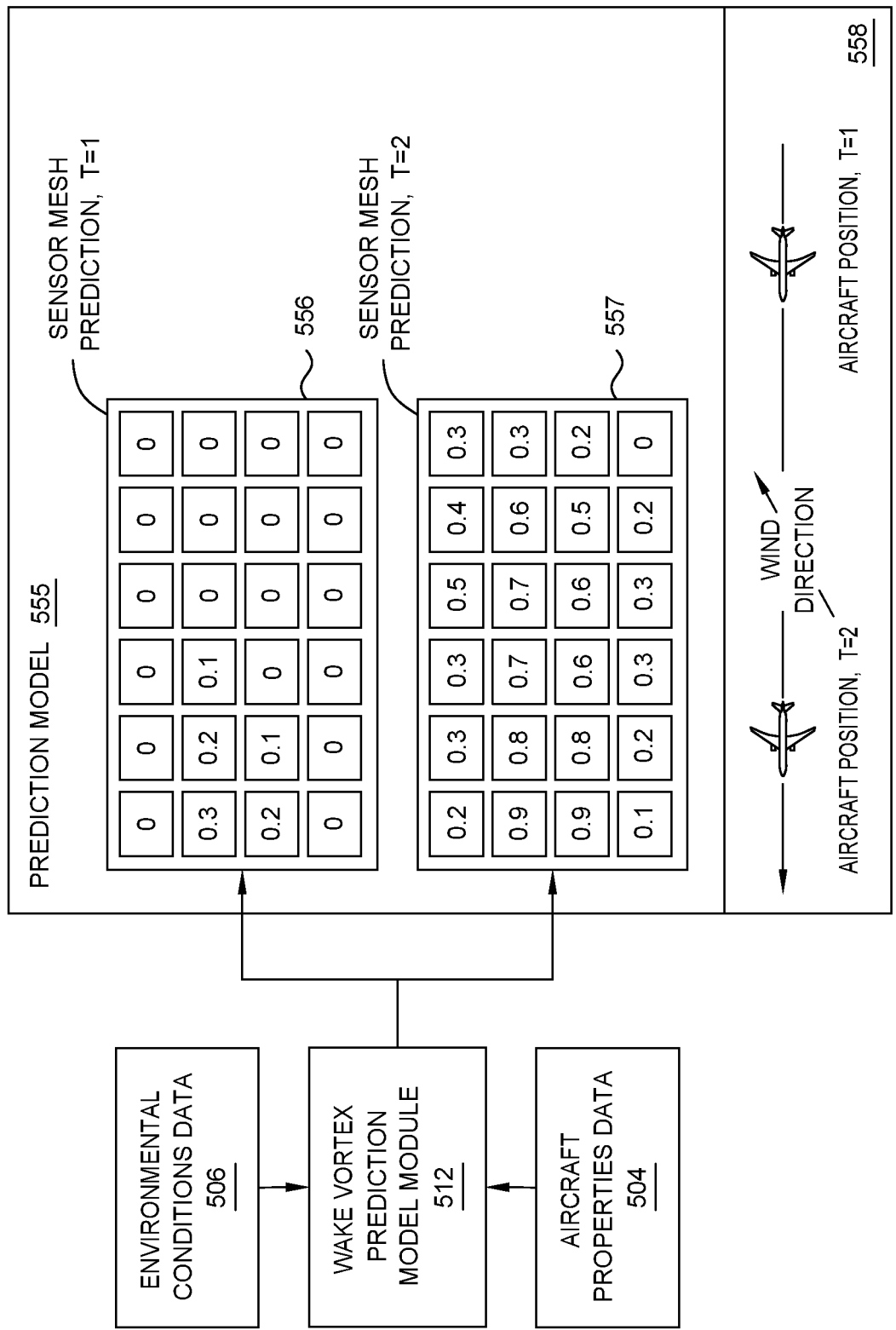
FIG. 5B depicts an example wake vortex prediction model.

FIG. 5B depicts an example of a wake vortex prediction model. As shown in FIG. 5BA, the wake vortex prediction module uses the prediction model 555 to predict sensor mesh values 556 at T1 and a sensor mesh values at T2.

For example, using the environmental conditions data 506 and aircraft properties data 504, when the aircraft 100 is at a first position at T1, the prediction model predicts which of the sensors in the sensor mesh will be experiencing vertical air flows associated with vortices created by aircraft 100. For examples, the predicted sensor mesh values 556 indicate that 5 sensors in the sensor mesh 202 expect some level of vertical air flow at T1. The wake vortex prediction module also generates the sensor mesh prediction for T2. The wake vortex prediction module then uses the predicted sensor mesh values 556 to determine a predicted wake vortex drift and updates the separation interval 515 based on the predicted wake vortex drift. The wake vortex prediction module thus provides a means to predict the separation interval based on the environmental conditions and past observed wake vortex drifts without waiting for the wake vortex to drift onto a physical sensor mesh. This prediction allows for quicker updating of the separation distance between the aircraft. For example, the prediction allows the separation interval 515 to be updated prior to the wake vortex 102 drifting onto the sensor mesh 202. In some examples, the machine learning module 550 and the wake vortex module interact to continually update the prediction model 555 to account for varying environmental conditions and measured vertical drifts at the wake vortex module 510.

Figure 6:
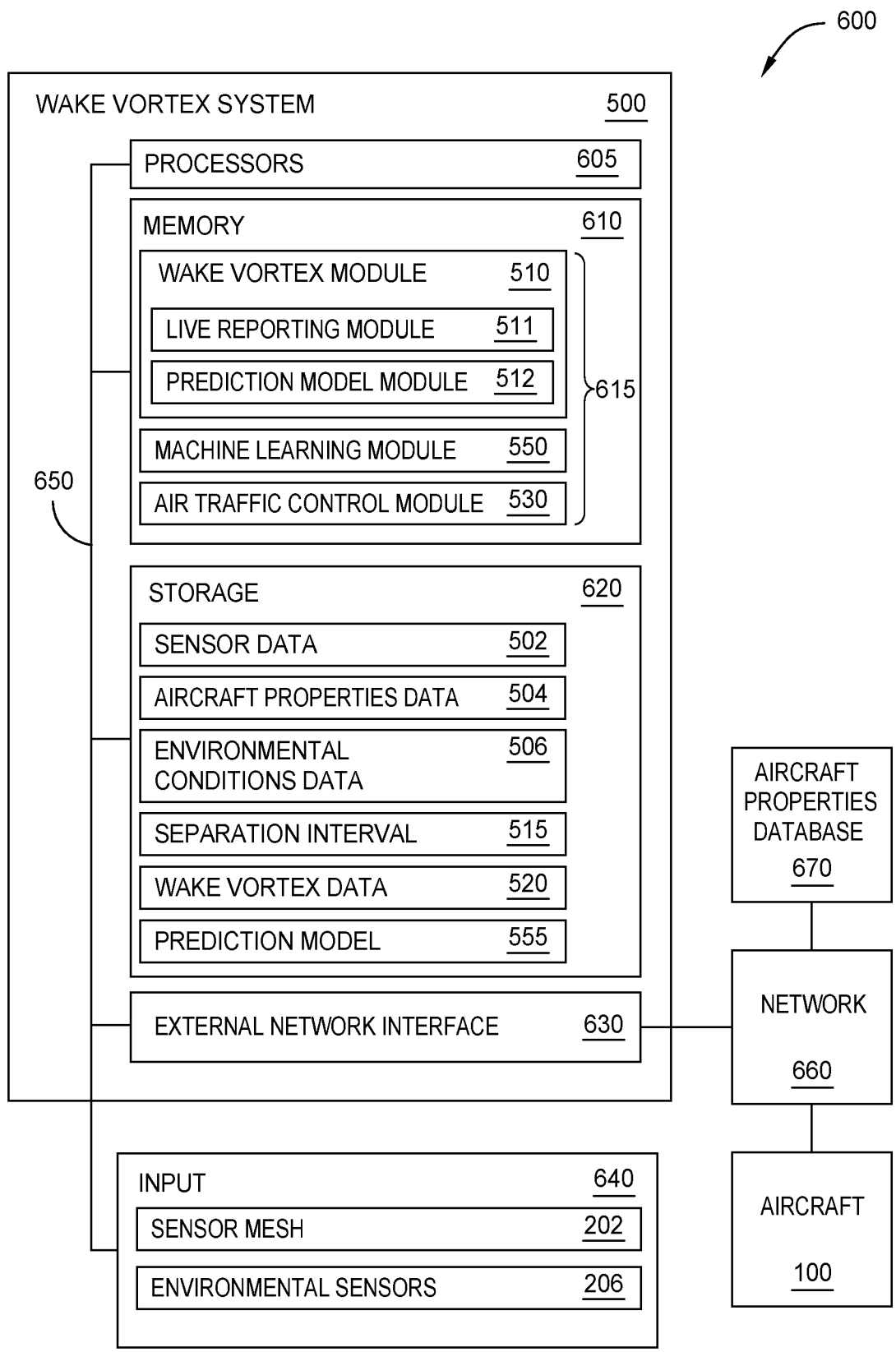
FIG. 6 depicts an example wake vortex system.

FIG. 6 depicts a block diagram of an example wake vortex system, wake vortex system 600. As shown in FIG. 6, wake vortex system 600 may include a server embodied as server/computer or wake vortex system (e.g. wake vortex system 500 of FIG. 5) to perform the methods described herein. While described herein in relation to wake vortex system 500, wake vortex system 600 may be individually embodied as hardware hosting and/or executing each of the modules shown in FIG. 5A. The components of wake vortex system 600 may include, but are not limited to, one or more processing units and/or processors 605, a system memory, such as memory 610, a storage system 620, a bus 650 that couples various system components including the memory 610 and storage system 620 to processors 605, an external network interface, such as interface 630, and an input/output interface 640 to the sensor mesh 202 and the environmental sensors 206. In some embodiments, wake vortex system 600 is distributed and includes a plurality of discrete computing devices that are connected through wired or wireless networking. Wake vortex system 600 uses the interface 630 to communicate over network 660 with aircraft 100 and the aircraft properties database 670 in this example.

Memory 610 includes a plurality of program modules 615 for performing various functions related to updating a separation interval between aircraft, described herein. The program modules 615 generally include program code that is executable by one or more of the processors 605. As shown, program modules 615 include wake vortex module 510, wake vortex live reporting module 511, wake vortex prediction module 512, machine learning module 550, and air traffic control module 530. Additionally, in this example the storage system 620 includes media for storing sensor data 502, aircraft properties data 504, environmental conditions data 506, separation interval 515, wake vortex database 520, prediction model, e.g., prediction model 555, and other information. The information stored in storage system 620 may be updated and accessed by the program modules 615.

Figure 7:
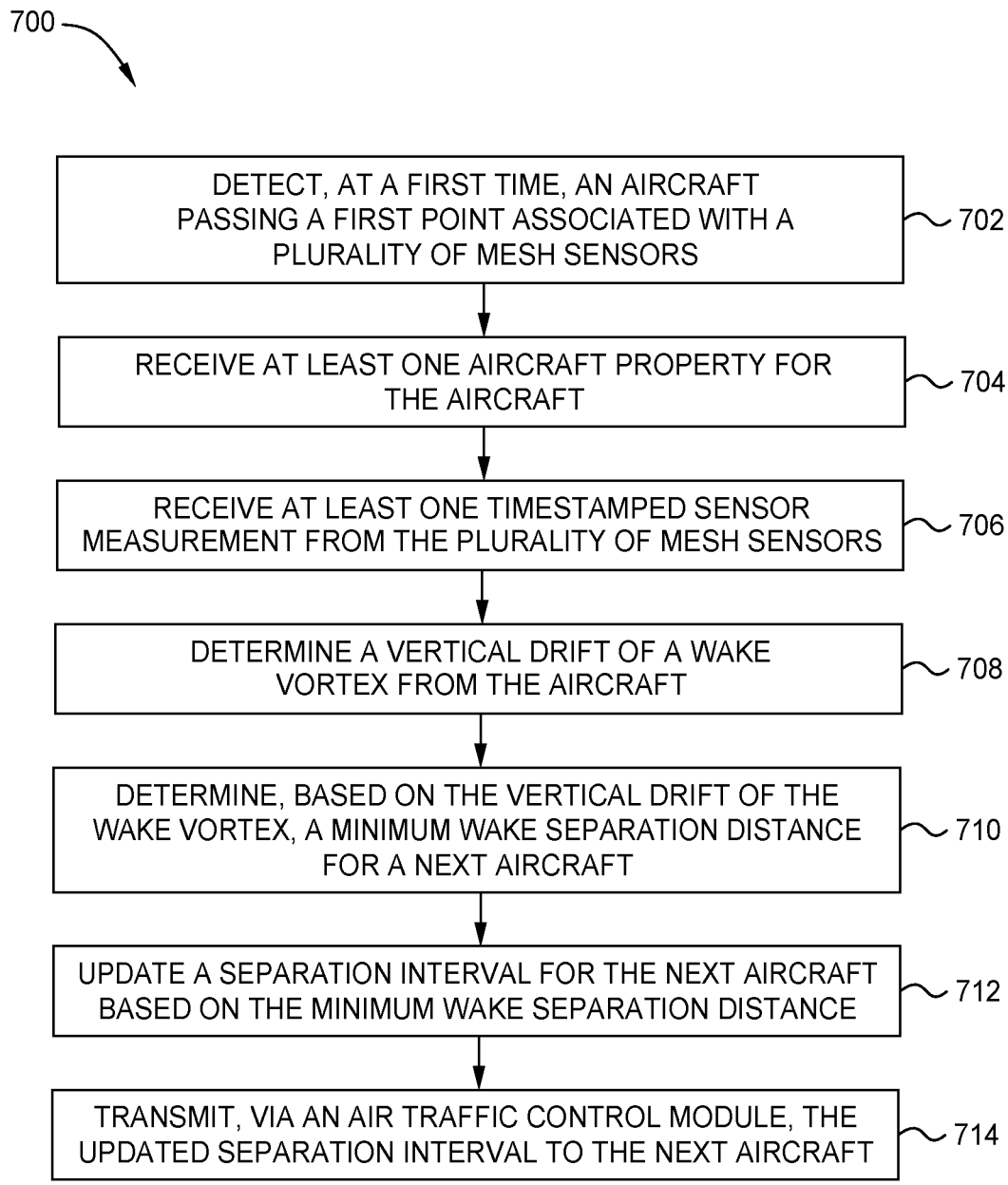
FIG. 7 depicts an example method for updating a separation interval between aircraft based on a wake vortex drift.

FIG. 7 is a flowchart of an example method, method 700, for updating a separation interval between aircraft based on a wake vortex drift.

Method 700 begins at block 702 where a wake vortex module (such as wake vortex module 510 in FIG. 5A) detects, at a first time, an aircraft passing a first point associated with a plurality of mesh sensors. For example, as described in relation to FIGS. 2-3, a wake vortex module detects that an aircraft 100 is passing the first point 302 at T1. In some examples, the aircraft 100 is detected at the first point 302 using positioning sensors, such as a radio (e.g., radar), visual, and/or any other type of detection sensors associated with the sensor mesh 202 and/or the wake vortex system 500. In some examples, the aircraft 100 transmits its location to the wake vortex system 500 (such as in the aircraft properties data 504) such that the wake vortex module uses the reported position of the aircraft 100 to determine it is at the first point 302 at T1.

At block 704 a wake vortex live reporting module receives at least one aircraft property for the aircraft. For example, as shown in FIG. 5A, the wake vortex live reporting module 511 receives the aircraft properties data 504. The aircraft properties data may include a lift of the aircraft at the first time, a speed of the aircraft at the first time, an altitude of the aircraft at the first time, (e.g., first altitude 307 in FIG. 3), an estimated current weight of the aircraft at the first time and/or an aircraft type of the aircraft.

At block 706 the wake vortex live reporting module receives at least one time-stamped sensor measurement from the plurality of mesh sensors. In some examples, the wake vortex live reporting module receives continuous sensor measurements from the sensor mesh 202 starting from at least the first time. The sensor measurements may include one or more air flow measurements including vertical air flow measurements from one or more vertical air flow sensors in the sensor mesh 202. In some examples, such as shown in FIG. 2, the one or more vertical air flow sensors and the sensor mesh 202 are positioned proximate to a runway 210 and/or along the aircraft path 212 for the runway 210. In some examples, the one or more air flow sensors are also positioned to measure a plurality of wake vortex winds, such that multiple aspects of the wake vortex 102 are captured by the sensor mesh 202.

At block 708 the wake vortex live reporting module determines a vertical drift of a wake vortex from the aircraft using the first time, the at least one time-stamped sensor measurement, and the at least one aircraft property. For example, the wake vortex live reporting module uses a difference in time between the first time and a second time (e.g., 60 seconds), and the difference in the aircraft height 306 (e.g., 1000 feet (ft)) and the altitude 309 (e.g. 710 ft) to determine that the wake vortex vertical drift (e.g., 312 in FIG. 3) is 300 ft per minute (ft/m).

At block 710, the wake vortex live reporting module determines, based on the vertical drift of the wake vortex, a minimum wake separation distance for a next aircraft. For example, when the wake vortex vertical drift is 300 ft/min the minimum separation distance can be calculated as a distance and/or time value. For example, if the wake vortex 102 should be at least 300 ft below the flight path for the following aircraft 110 (assuming the same or similar flight path as the aircraft 100), the minimum separation distance is at least 60 seconds and/or a corresponding distance based on the speeds of the aircraft 100 and the following aircraft 110.

At block 712, the wake vortex live reporting module updates a separation interval for the next aircraft based on the minimum wake separation distance. For example, when the minimum separation distance is 60 seconds, the wake separation distance 104 is updated to reduce the excess wake separation distance 106. For example, when the following aircraft 110 follows the aircraft 100 at a 120 seconds separation interval, the separation interval can be reduced to 60 seconds or another value between 60 seconds and 120 seconds, thus allowing the following aircraft 110 to enter airspace that would be previously restricted by the excess wake separation distance 106.

At block 714, the wake vortex live reporting module transmits, for example via an air traffic control module 530, the updated separation interval to the next aircraft. In some examples, the air traffic control module 530 transmits the updated separation interval 515 as part of air traffic control transmission and instructions. For example, the air traffic control module 530 instructs the following aircraft 110 to maneuver such that the wake separation distance 104 is reduced.

Figure 8:
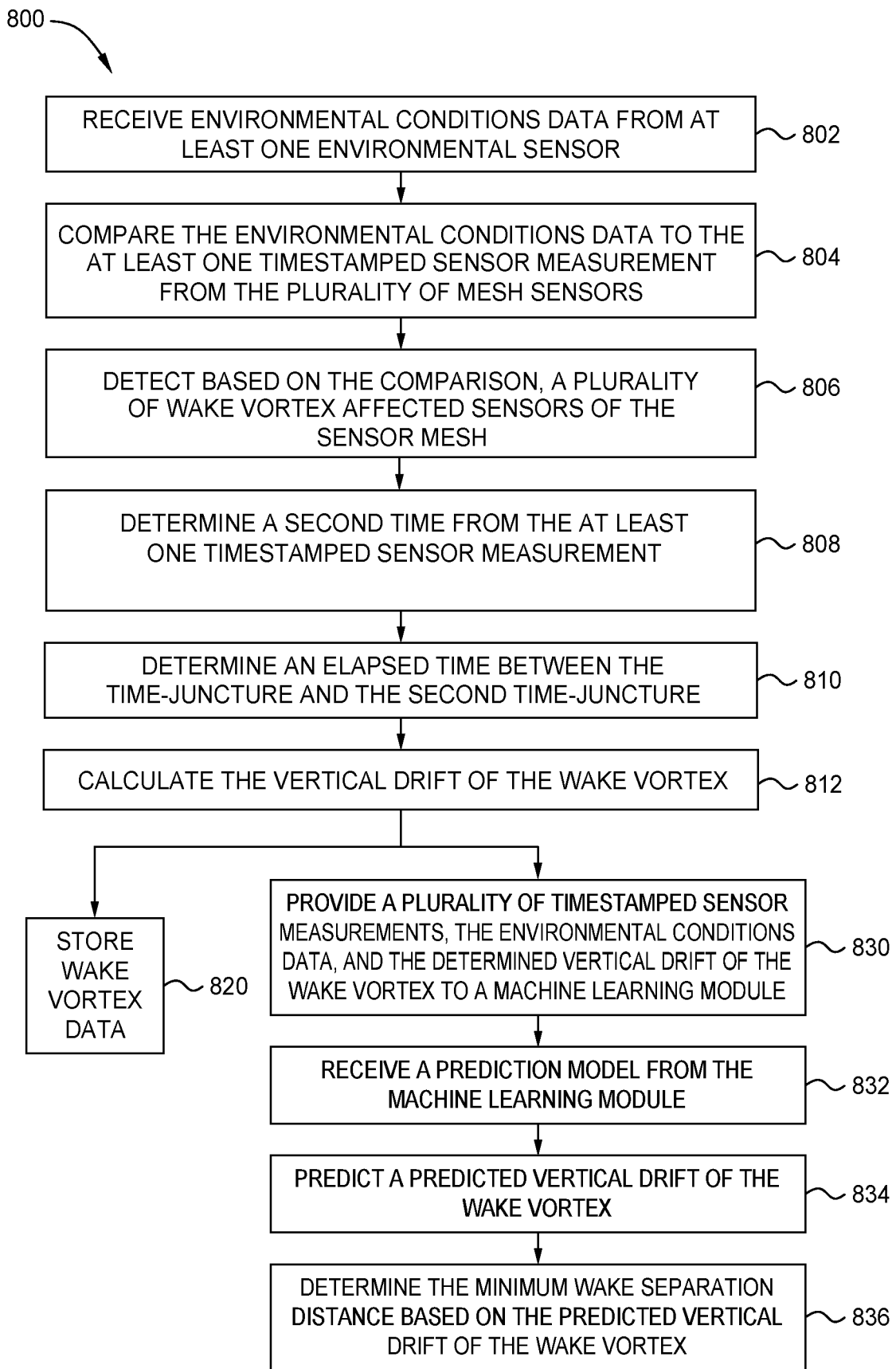
FIG. 8 depicts an example method for determining a vertical drift of a wake vortex.

FIG. 8 is a flowchart of an example method, method 800, for determining a vertical drift of a wake vortex. Method 800 begins at block 802 where the wake vortex module (e.g., wake vortex module 510 in FIG. 5A) receives environmental conditions data from one or more environmental sensors. For example, as described in relation to FIG. 5A, the live reporting module receives the environmental conditions data 506 from the environmental sensors 206. In some examples, the environmental conditions data 506 includes data representing the ambient conditions of the environment near the sensor mesh 202 and the wake vortex system 500.

At block 804 the wake vortex live reporting module compares the environmental conditions data to the one or more time-stamped sensor measurements. For example, the module compares an ambient wind and/or vertical winds from the environmental conditions data to the winds and/or vertical winds in the time-stamped sensor measurements in the sensor data 502. In some examples, the comparison indicates that there is minimal difference between the sensor data 502 and the environmental conditions data 506. When there is minimal or no difference, the wake vortex is determined to not have yet drifted into the sensor mesh 202.

At block 806 the wake vortex live reporting module detects based on the comparison, a plurality of wake vortex affected sensors of the plurality of mesh sensors. For example, the module detects a difference above a threshold in the vertical winds measured at the sensor mesh 202 and the ambient conditions measured at the environmental sensors 206, indicating that the wake vortex 102 has drifted onto the sensor mesh 202. The time-stamped measurements with the vertical winds are correlated to the affected sensors 404 or 454 as shown in FIGS. 4A-4B.

At block 808, the wake vortex live reporting module determines a second time from the one or more time-stamped vertical wind speed measurements. In some examples, the second time (T2) is a time after the first time (T1) when the one or more time-stamped sensor measurements indicate the wake vortex has drifted into the plurality of affected sensors of the sensor mesh. For example, when the module detects that the vertical air flows from the wake vortex 102 have drifted into the sensor mesh 202, the module parses the time-stamp from the corresponding measurement to determine the second time, T2. In some examples, the module may use an average of the times that the wake vortex is detected as it drifts into the sensor mesh. For example, if the comparison in block 806 indicates that the wake vortex 102 begins drifting onto the sensor mesh 202 at a time 45 second after a first time (T1) and ends at a time 75 seconds after the first time (T1), the module uses the average time of 60 seconds for the second time (T2) value. In other examples, the module uses the time that the wake vortex is first detected as the second time (T2) or uses the time the wake vortex is last detected as T2.

At block 810, the wake vortex live reporting module determines an elapsed time between the first time (T1) and the second time (T2). For example, when T1 is at a time 0 (e.g., a clock time of 12:13.56) and T2 is at a time 60 seconds (e.g., a clock time of 12:14.56), the module determines the difference is 60 seconds.

At block 812, the wake vortex live reporting module calculates the vertical drift of the wake vortex using a height of the aircraft above the sensor mesh at the first time and the elapsed time. For example, the wake vortex live reporting module uses a difference in time between T1 and T2 (e.g., 60 seconds), and the in the aircraft height 306 (e.g., 300 feet (ft)) to determine that the wake vortex vertical drift 312 is 300 ft per minute (ft/min).

At block 820, the wake vortex module stores wake vortex data. In some examples, the wake vortex module stores the wake vortex data in the wake vortex database 520 for further use and review. In some examples, the wake vortex data includes an identification of the plurality of wake vortex affected sensors, a set of time-stamped sensor measurements from the plurality of wake vortex affected sensors, environmental conditions from the environmental conditions data at the second (T2), a current position of the aircraft at the second time (T2), and an altitude of the aircraft at the second time (T2). The wake vortex data can then be used for further processes, such as machine learning as described above with respect to FIG. 5A.

At block 830, a wake vortex prediction module provides and/or directs a plurality of time-stamped sensor measurements, the environmental conditions data, and the determined vertical drift of the wake vortex to a machine learning module. For example, the wake vortex prediction module may directly provide the information to the machine learning module 550 and/or stored the wake vortex data in the wake vortex database 520 for access by the machine learning module.

At block 832, the wake vortex prediction module receives a prediction model from the machine learning module. For example, the machine learning module receives the prediction model 555 as described in FIGS. 5A-5B from the machine learning module 550.

At block 834, the wake vortex prediction module predicts (using the prediction model) a vertical drift of the wake vortex based on the at least one aircraft property, and the environmental conditions data, a predicted. For example, as described in relation to FIG. 5B, a second time may be estimated based on the output from the prediction model 555.

At block 836, the wake vortex prediction module determines the minimum wake separation distance based on the predicted vertical drift of the wake vortex. For example, when the predicted vertical drift is 275 ft/m the minimum separation distance can be calculated as a distance and/or time value. In some examples, if the wake vortex 102 is predicted to be at least 275 ft below the flight path for the following aircraft 110 (assuming the same flight path as the aircraft 100), the minimum separation distance based on the predicted vertical drift is at least 60 seconds and/or a corresponding distance based on the speeds of the aircraft 100 and the following aircraft 110. In some examples, the wake vortex module uses the minimum wake separation distance from the predicted vertical drift to update the separation interval 515. This allows for quicker updating of the separation distance between the aircraft. For example, the prediction allows the separation interval 515 to be updated prior to the wake vortex 102 drifting onto the sensor mesh 202. In some examples, the machine learning module 550 and the wake vortex module interact to continually update the prediction model 555 to account for varying environmental conditions and measured vertical drifts at the wake vortex module 510.

In some examples, the prediction model 555 is updated and trained by the machine learning module 550 using the wake vortex data in the wake vortex database 520 and observed conditions and separation intervals. For example, a predicted vertical drift for a following aircraft may be compared to an observed vertical drift determined by the live reporting module 511 and the machine learning module 550 updates the prediction model 555 according to the observed vertical drift.

In the preceding, reference is made to embodiments presented in this disclosure. However, the scope of the present disclosure is not limited to specific described embodiments. Instead, any combination of the described features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

As described above, including in relation to FIG. 6, various computing components may be included to perform the methods described herein. For example, bus 650 represents one or more of any of several types of bus structures, including a memory bus or memory controller, a peripheral bus, an accelerated graphics port, and a processor or local bus using any of a variety of bus architectures. In some examples, such architectures may include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Further, wake vortex system 500 typically includes a variety of computer system readable media. Such media may be any available media that is accessible by wake vortex system 500, and it includes both volatile and non-volatile media, removable and non-removable media.

Memory 610 can include computer system readable media in the form of volatile memory, such as random access memory (RAM) and/or cache memory. Wake vortex system 500 may further include other removable/non-removable, volatile/non-volatile computer system storage media. In some examples, storage system 620 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a Compact Disc Read-Only Memory (CD-ROM), Digital versatile disc-read only memory (DVD-ROM) or other optical media can be provided. In such instances, each can be connected to bus 650 by one or more data media interfaces.

As depicted and described above, memory 610 may include at least one program product having a set (e.g., at least one) of program modules 615 that are configured to carry out the functions of embodiments of the invention. Wake vortex system 500 may further include other removable/non-removable volatile/non-volatile computer system storage media. In some examples, storage system 620 may be included as part of memory 610 and may typically provide a non-volatile memory for the networked computing entities, and may include one or more different storage elements such as Flash memory, a hard disk drive, a solid state drive, an optical storage entity, and/or a magnetic storage entity.

As will be appreciated by one skilled in the art, the embodiments disclosed herein may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, Radio Frequency (RF), etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described above with reference to flowchart illustrations and/or block diagrams of methods, apparatus (systems) and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other entities to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other entities to cause a series of operational steps to be performed on the computer, other programmable apparatus or other entities to produce a computer implemented process such that the instructions which execute on the computer or other programmable apparatus provide processes for implementing the functions/acts specified in the flowchart and/or block diagram block or blocks.

One or more embodiments may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g., an amount of storage space consumed by a user or a number of virtualized systems instantiated by the user). A user can access any of the resources that reside in the cloud at any time, and from anywhere across the Internet. In context of the present disclosure, a user may access applications (e.g., wake vortex module 510) or related data available in the cloud. In such a case, each module could access data stored at a storage location in the cloud, and could store associated data in the cloud. Doing so allows a user to access this information from any computing system attached to a network connected to the cloud (e.g., the Internet).

The flowchart and block diagrams in the Figures illustrate the architecture, functionality and operation of possible implementations of systems, methods and computer program products according to various embodiments. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In view of the foregoing, the scope of the present disclosure is determined by the claims that follow.

What is claimed is:

1. A method for wake separation distance comprising:
   detecting, at a first time, an aircraft passing a first point associated with a plurality of mesh sensors;
   receiving at least one aircraft property for the aircraft;
   receiving at least one time-stamped sensor measurement from the plurality of mesh sensors;
   determining a vertical drift of a wake vortex from the aircraft using the first time, the at least one time-stamped sensor measurement, and the at least one aircraft property;
   determining, based on the vertical drift of the wake vortex, a minimum wake separation distance for a next aircraft; and
   updating a separation interval for the next aircraft based on the minimum wake separation distance.

2. The method of claim 1, wherein the plurality of mesh sensors comprise:
   one or more vertical air flow sensors, wherein:
      the one or more vertical air flow sensors are positioned proximate to a runway and along an aircraft path for the runway, and
      the one or more vertical air flow sensors are further positioned to sense air flow associated with a wake vortex.

3. The method of claim 1, wherein the at least one aircraft property comprises one or more of:
   a lift of the aircraft at the first time;
   a speed of the aircraft at the first time;
   an altitude of the aircraft at the first time;
   an estimated current weight of the aircraft at the first time; or
   an aircraft type of the aircraft.

4. The method of claim 1, wherein determining the vertical drift of the wake vortex from the aircraft comprises:
   receiving environmental conditions data from at least one environmental sensor;
   comparing the environmental conditions data to the at least one time-stamped sensor measurement from the plurality of mesh sensors;
   detecting based on the comparison, one or more wake vortex affected sensors of the plurality of mesh sensors;
   determining a second time based on the at least one time-stamped sensor measurement, wherein the second time indicates the wake vortex has drifted into the one or more wake vortex affected sensors of the plurality of mesh sensors;
   determining an elapsed time between the first time and the second time; and
   calculating the vertical drift of the wake vortex based on a height of the aircraft above the plurality of mesh sensors at the first time and the elapsed time.

5. The method of claim 4, further comprising:
   storing wake vortex data comprising:
      an identification of the one or more wake vortex affected sensors;
      a set of time-stamped sensor measurements from the one or more wake vortex affected sensors;
      environmental conditions from the environmental conditions data at the second time;
      a current position of the aircraft at the second time; and
      an altitude of the aircraft at the second time.

6. The method of claim 1, further comprising:
   providing a plurality of time-stamped sensor measurements, environmental conditions data, and the determined vertical drift of the wake vortex to a machine learning module;
   receiving a prediction model from the machine learning module;
   predicting, using the prediction model a predicted vertical drift of the wake vortex based on the at least one aircraft property, and the environmental conditions data; and
   determining the minimum wake separation distance based on the predicted vertical drift of the wake vortex.

7. The method of claim 1, the method further comprising:
transmitting, via an air traffic control module, the updated separation interval to the next aircraft.

8. A system for wake separation distance comprising:
   a processor; and
   a memory comprising instructions which, when executed on the processor, performs an operation, the operation comprising:
      detecting, at a first time, an aircraft passing a first point associated with a plurality of mesh sensors;
      receiving at least one aircraft property for the aircraft;
      receiving at least one time-stamped sensor measurement from the plurality of mesh sensors;
      determining a vertical drift of a wake vortex from the aircraft using the first time, the at least one time-stamped sensor measurement, and the at least one aircraft property;

determining, based on the vertical drift of the wake vortex, a minimum wake separation distance for a next aircraft; and updating a separation interval for the next aircraft based on the minimum wake separation distance.

9. The system of claim 8, wherein the plurality of mesh sensors comprise:
one or more vertical air flow sensors, wherein:
the one or more vertical air flow sensors are positioned proximate to a runway and along an aircraft path for the runway, and
the one or more vertical air flow sensors are further positioned to measure a plurality of wake vortex air flows.

10. The system of claim 8, wherein the at least one aircraft property comprises one or more of:
a lift of the aircraft at the first time;
a speed of the aircraft at the first time;
an altitude of the aircraft at the first time;
an estimated current weight of the aircraft at the first time; or
an aircraft type of the aircraft.

11. The system of claim 8, wherein determining the vertical drift of the wake vortex from the aircraft comprises:
receiving environmental conditions data from at least one environmental sensor;
comparing the environmental conditions data to the at least one time-stamped sensor measurement from the plurality of mesh sensors;
detecting based on the comparison, one or more wake vortex affected sensors of the plurality of mesh sensors;
determining a second time based on the at least one time-stamped sensor measurement, wherein the second time indicates the wake vortex has drifted into the one or more wake vortex affected sensors of the plurality of mesh sensors;
determining an elapsed time between the first time and the second time; and
calculating the vertical drift of the wake vortex based on a height of the aircraft above the plurality of mesh sensors at the first time and the elapsed time.

12. The system of claim 11, wherein the operation further comprises:
storing wake vortex data comprising:
an identification of the one or more wake vortex affected sensors;
a set of time-stamped sensor measurements from the one or more wake vortex affected sensors;
environmental conditions from the environmental conditions data at the second time;
a current position of the aircraft at the second time; and
an altitude of the aircraft at the second time.

13. The system of claim 8, wherein the operation further comprises:
providing a plurality of time-stamped sensor measurements, environmental conditions data, and the determined vertical drift of the wake vortex to a machine learning module;
receiving a prediction model from the machine learning module;
predicting a predicted vertical drift of the wake vortex based on the prediction model, the at least one aircraft property, and the environmental conditions data; and
determining the minimum wake separation distance based on the predicted vertical drift of the wake vortex.

14. The system of claim 8, wherein the operation further comprises:

transmitting, via an air traffic control module, the updated separation interval to the next aircraft.

15. A non-transitory, computer-readable medium comprising computer-executable code that, when executed by a processor of a processing system, cause the processor to perform a method, the method comprising:
detecting, at a first time, an aircraft passing a first point associated with a plurality of mesh sensors;
receiving at least one aircraft property for the aircraft;
receiving at least one time-stamped sensor measurement from the plurality of mesh sensors;
determining a vertical drift of a wake vortex from the aircraft using the first time, the at least one time-stamped sensor measurement, and the at least one aircraft property;
determining, based on the vertical drift of the wake vortex, a minimum wake separation distance for a next aircraft; and
updating a separation interval for the next aircraft based on the minimum wake separation distance.

16. The computer-readable medium of claim 15, wherein the plurality of mesh sensors comprise:
one or more vertical air flow sensors, wherein:
the one or more vertical air flow sensors are positioned proximate to a runway and along an aircraft path for the runway, and
the one or more vertical air flow sensors are further positioned to measure a plurality of wake vortex air flows.

17. The computer-readable medium of claim 15, wherein the at least one aircraft property comprises one or more of:
a lift of the aircraft at the first time;
a speed of the aircraft at the first time;
an altitude of the aircraft at the first time;
an estimated current weight of the aircraft at the first time; or
an aircraft type of the aircraft.

18. The computer-readable medium of claim 15, wherein determining the vertical drift of the wake vortex from the aircraft comprises:
receiving environmental conditions data from at least one environmental sensor;
comparing the environmental conditions data to the at least one time-stamped sensor measurement from the plurality of mesh sensors;
detecting based on the comparison, one or more wake vortex affected sensors of the plurality of mesh sensors;
determining a second time based on the at least one time-stamped sensor measurement, wherein the second time indicates the wake vortex has drifted into the one or more wake vortex affected sensors of the plurality of mesh sensors;
determining an elapsed time between the first time and the second time; and
calculating the vertical drift of the wake vortex based on a height of the aircraft above the plurality of mesh sensors at the first time and the elapsed time.

19. The computer-readable medium of claim 18, wherein the method further comprises:
storing wake vortex data comprising:
an identification of the one or more wake vortex affected sensors;
a set of time-stamped sensor measurements from the one or more wake vortex affected sensors;
environmental conditions from the environmental conditions data at the second time;

a current position of the aircraft at the second time; and
an altitude of the aircraft at the second time.

20. The computer-readable medium of claim 15, wherein the method further comprises:
providing a plurality of time-stamped sensor measurements, environmental conditions data, and the determined vertical drift of the wake vortex to a machine learning module;
receiving a prediction model from the machine learning module;
predicting a predicted vertical drift of the wake vortex using the prediction model, the at least one aircraft property, and the environmental conditions data; and
determining the minimum wake separation distance based on the predicted vertical drift of the wake vortex.

* * * * *